United States Patent [19]

Takayama et al.

[11] Patent Number: 4,942,622

[45] Date of Patent: Jul. 17, 1990

[54] MOBILE RADIO-RECEIVER SYSTEM WITH IMPROVED REPRODUCTION CHARACTERISTICS OF RECEPTION SIGNAL HAVING NOISE SUPERIMPOSED THEREON

[75] Inventors: Kazuo Takayama, Kobe; Hidefumi Fuse, Nagoya, both of Japan

[73] Assignees: Fujitsu Ten Limited, Hyogo; Toyota Jidosha Kabushiki Kaisha, Aichi, both of Japan

[21] Appl. No.: 218,231

[22] Filed: Jul. 13, 1988

[30] Foreign Application Priority Data

Jul. 16, 1987 [JP]  Japan ................................. 62-175944

[51] Int. Cl.$^5$ .............................................. H04B 7/08
[52] U.S. Cl. ..................................... 455/278; 455/33; 455/277; 375/77
[58] Field of Search ................. 455/52, 186, 277, 278, 455/182, 33; 358/328, 310; 375/77; 364/441, 132, 452

[56] References Cited

U.S. PATENT DOCUMENTS 4,525,869  6/1985  Hamada et al. ..................... 455/278
4,619,002 10/1986  Thro ..................................... 455/52
4,633,330 12/1986  Yamamitsu et al. ................ 358/310

FOREIGN PATENT DOCUMENTS 57-184331 11/1982  Japan .
59-17740   1/1984  Japan .................................. 455/277
61-191127  8/1986  Japan .
2071465    9/1981  United Kingdom ................ 455/277

*Primary Examiner*—Reinhard J. Eisenzopf
*Assistant Examiner*—Lisa D. Charouel
*Attorney, Agent, or Firm*—Oliff & Berridge

[57] ABSTRACT

Disclosed is a mobile radio-receiver system built-into an FM radio-receiver set installed in a vehicle, wherein a reproduction characteristic of a reception signal, such as a sound signal, having noise superimposed thereon is improved. The mobile radio-receiver system includes a space diversity unit which receives two reception signals and selects one reception signal on which noise is smaller than on the other reception signal, and a signal prediction unit which ignores the selected signal for a predetermined time in which large noise remains in the selected signal, and predicts a reception signal for the ignored selected signal for the predetermined time, so that a quality of a reproduction sound from the FM radio-receiver set is greatly improved.

14 Claims, 6 Drawing Sheets

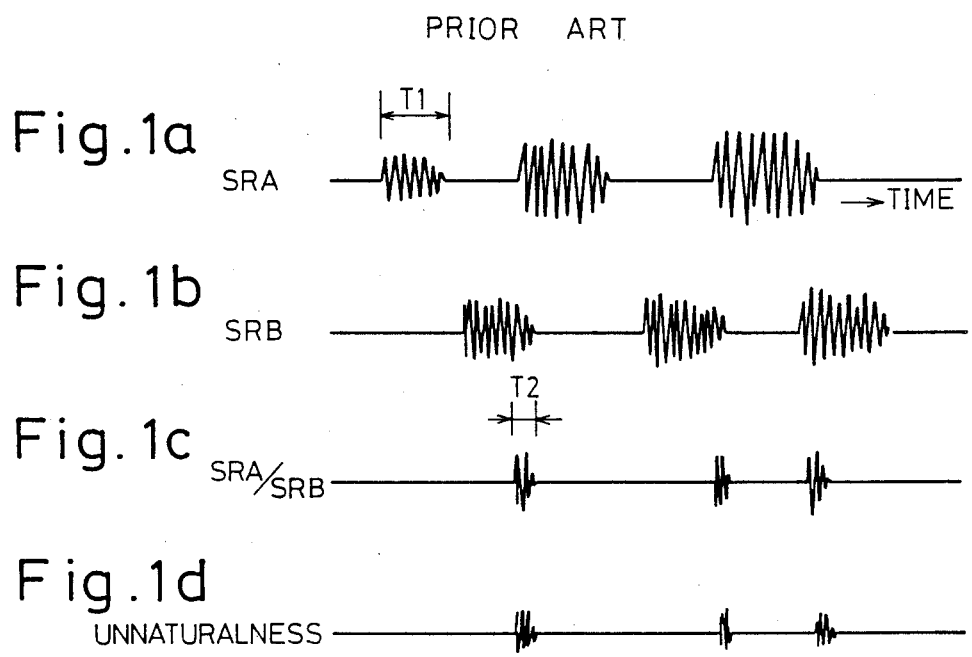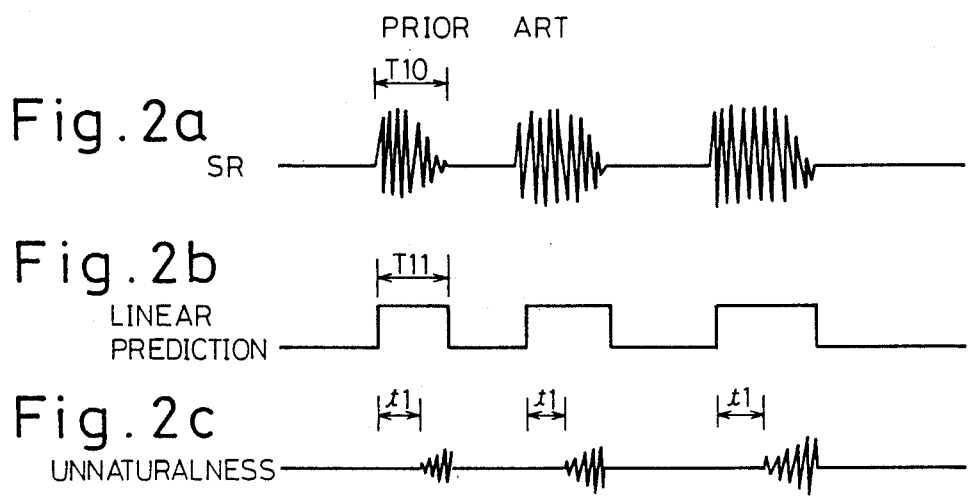

S5B=0 : $k_\ell = 1$
S5B=1 : $k_\ell = 0$

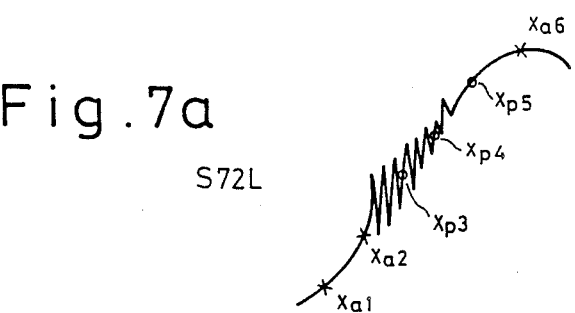
Fig.7a S72L
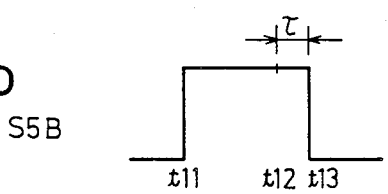
Fig.7b S5B
Fig.8a S1A 
Fig.8b S1B 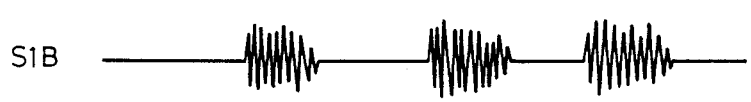
Fig.8c S3 
Fig.8d LINEAR PREDICTION 
Fig.8e UNNATURALNESS 

MOBILE RADIO-RECEIVER SYSTEM WITH IMPROVED REPRODUCTION CHARACTERISTICS OF RECEPTION SIGNAL HAVING NOISE SUPERIMPOSED THEREON

BACKGROUND OF THE INVENTION

1. Field of the Invention

The present invention relates to a mobile radio-receiver system, more particularly, to a mobile radio-receiver system applied to a radio-receiver set mounted on a vehicle, wherein a reproduction characteristic of a reception signal having noise superimposed thereon is improved.

The present invention also relates to a sound reproduction system, such as an FM radio-receiver unit, including such a radio-receiver system.

2. Description of the Related Art

In a radio-communication system, a radio-reception signal has noise superimposed thereon, and thus the radio-receiver unit must eliminate the affect of this noise to provide a high quality reproduction signal. As a typical example thereof, a signal received at a radio-receiver of a mobile radio-communication system is greatly affected by noise superimposed thereon, according to the time and place at which the signal is received.

In a mobile sound reproduction system installed in a vehicle and including a mobile radio-receiver system, more specifically, in an FM radio-receiver set installed in an automobile, the noise in a received signal is mainly due to standing waves and multi-paths. A diversity system is able to eliminate the affect of the standing-wave noise, and a high pass filtering and/or signal prediction means are able to obviate the affect of the multi-path noise. Nevertheless, the diversity system can not eliminate the multipath-noise, and the high pass filtering and/or signal prediction means can not obviate the standing-wave noise. Accordingly, to reproduce the received signal with a high quality, i.e., to reproduce speech or music through the radio-receiver set while maintaining the quality of the original transmitted sound, all noise must be effectively eliminated by the mobile radio-receiver system.

Many approaches have been made in attempts to eliminate the affect of noise, but these prior art methods can not provide a high quality reproduction signal. The prior art methods will be described later in more detail with reference to specific examples and the drawings.

SUMMARY OF THE INVENTION

An object of the present invention is to provide an improved and novel mobile radio-receiver system which can effectively eliminate an affect of noise superimposed on a received signal and applied to a sound reproduction system mounted in a vehicle.

Another object of the present invention is to provide a mobile radio-receiver system which can be constructed in a small size and at a low cost.

Still another object of the present invention is to provide a sound reproduction system built-into the above mobile radio-receiver system.

According to the present invention, there is provided a mobile radio-receiver system including a mobile radio-receiver system including, a pair of antennas installed on a mobile body and spaced at a predetermined distance; a switching circuit operatively connected to the pair of antenna to receive two different radio-reception signals therefrom and for selecting one of the radio-reception signals in response to a switching signal; a detection unit operatively connected to the switching circuit for detecting the selected signal therefrom; a noise detection unit operatively connected to the detection unit, for detecting noise superimposed on the signal detected at the detection unit and outputting a noise detection signal; an antenna switching control unit, operatively connected between the noise detection unit and the switching circuit, for outputting the switching signal to the switching circuit in response to the noise detection signal; and a digital signal correction unit operatively connected to the detection unit and including an analog-to-digital converting circuit for converting the data from the detection unit in an analog form into a digital value, a digital-type signal prediction circuit for digitally predicting data converted at the analog-to-digital converting circuit and an digital-to-analog converting circuit for converting data from the digital-type signal prediction unit into data in a digital form, the digital-type signal prediction unit being operated in synchronization with a sampling time of the analog-to-digital converting circuit, and the digital-to-analog converting circuit being operated in synchronization with the operation of the signal prediction unit, for digitally correcting data from the detection unit when the noise detection signal indicates the existence of noise, or for outputting the data from the detection unit when the noise detection signal does not indicate the existence of noise.

Namely, the mobile radio-receiver system includes a diversity portion for selecting a low-noise reception signal, and a signal correction portion for correcting the selected signal when noise is superimposed on the selected signal.

Preferably, the detection unit converts the selected signal at an intermediate frequency, prior to the detecting.

The noise detection unit may include a first noise detection circuit having a high pass filtering circuit for receiving the detected signal and for passing a high frequency signal corresponding to the noise, and a first comparing circuit for comparing the high frequency signal with a first threshold level to provide a first noise detection signal, and a second noise detection circuit having a signal holding circuit for receiving and holding the first noise detection signal, a time delay circuit having a predetermined time constant for delaying the held signal by the predetermined time constant, and an adding circuit for adding the held signal and the delayed signal to provide a second noise detection signal which is rapidly changed in response to a change of the first noise detection signal to a high level and slowly changed in response to a change of the first noise detection signal to a low level. The noise detection signal comprises the first and second noise detection signals. The antenna switching control circuit outputs the switching signal in response to the second noise detection signal.

The first noise detection circuit in the noise detection circuit may further include a hysteresis judging circuit for judging the first noise detection signal output from the first comparing circuit by a hysteresis characteristic thereof.

The antenna switching control circuit may include a second comparing circuit for comparing the first noise detection signal with a second threshold level and a signal alternating circuit for alternating a signal level of an output of the second comparing circuit to provide the switching signal.

The correction circuit may include a linear signal prediction circuit for a linear prediction of the detected signal.

The linear signal prediction circuit may calculate a linear prediction data $X_n$, defined by the following formula:

$$X_n = 2X_{n-1} - X_{n-2}$$

where, $X_{n-1}$ is a first previous normal data, and $X_{n-2}$ is a second previous normal data.

The linear signal prediction circuit may calculate a linear prediction data $X_n$, defined by the following formula:

$$X_n = \tfrac{1}{2}(4 \cdot X_{n-1} - 3 \cdot X_{n-2} + 2X_{n-3} - X_{n-4})$$

where, $X_{n-1}$ to $X_{n-4}$ are first to fourth previous normal data.

The correction circuit may include a memory for storing normal data, and outputting the stored normal data as the correction data in response to a predetermined sequence when the noise detection signal indicates the existence of noise.

The output of the stored normal data can be effected synchronously with the detection of noise.

The mobile radio-receiver system may further include a signal multiplexing circuit provided between the detection circuit and the signal correction circuit, for multiplexing the detected signal into right and left channel signals for a reproduction of stereo sound. The signal correction circuit includes right and left channel signal correction circuits receiving the right and left channel signals, respectively, and independently correcting the received signals.

A sound reproduction system further includes a sound reproduction unit connected to the signal correction circuit, in addition to the above radio-receiver system.

The above digital signal correction unit can be replaced by an analog-type signal correction unit.

BRIEF DESCRIPTION OF THE DRAWINGS

Other objects and features of the present invention will be described with reference to the accompanying drawings, in which:

FIGS. 1a to 1d are graphs illustrating the operation of a prior art diversity method;

FIGS. 2a to 2c are graphs representing the operation of a prior art linear signal prediction method;

FIGS. 7a and 7b are graphs also representing a linear signal prediction of the linear signal prediction circuit shown in FIG. 5;

FIGS. 8a to 8e are graphs representing the overall operation of the mobile radio-receiver system shown in FIG. 3; and, FIG. 9 is a circuit diagram of another embodiment of a signal prediction circuit shown in FIG. 3, in accordance with the present invention.

DESCRIPTION OF THE PREFERRED EMBODIMENTS

Figure 3:
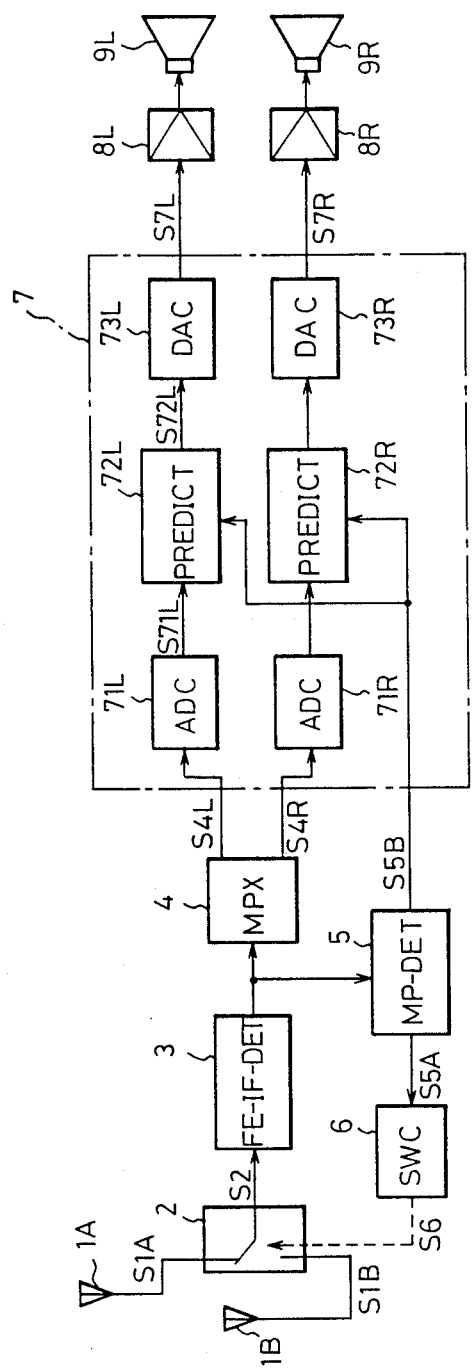
FIG. 3 is a block diagram of an embodiment of a sound reproduction system built-into a mobile radio-receiver system, according to the present invention.

Before describing the preferred embodiments of the present invention, some examples of the prior arts will be first described.

A space diversity receiving system is extensively used for a radio-receiver mounted in an automobile, or the like. As radio waves are reflected by obstacles, such as buildings, and these reflected radio waves and the direct radio waves are mutually superimposed standing waves which do not depend on time, i.e., are constant in time, and have an amplitude varying in a sinusoidal wave form. In the space diversity receiving system, two receiving antenna are provided on the automobile and spaced at a predetermined distance from each other; this predetermined distance generally being approximately $\lambda/4$, where $\lambda$ is a wave length of the radio wave, and a received signal from one receiving antenna stronger than another received signal from another receiving antenna is selected and used as a final reproduction signal.

In addition to the above described changes in the strength of the radio waves due to the standing waves generated by interference between the direct radio waves and the reflected radio waves, noise known as "multipath noise" in this field, is caused by an abrupt change of a phase of the radio wave, and since an FM radio-set depends on the phase of a signal, this multipath noise affects the reproduction quality of the FM radio set. This multipath has a particularly adverse affect on the FM radio set when a strength or an amplitude of the radio wave is low.

Referring to FIGS. 1a to 1d, the operation of a diversity method will be described. FIGS. 1a and 1b show waveforms of reception signals SRA and SRB received at two diversity antennas A and B. In the drawings, linear lines represent clear stereo signals not affected by noise, and burst polygonal lines represent noise components superimposed on the clear stereo signals. FIGS. 1a and 1b show that the stereo signals corresponding to the reception signals SRA and SRB from the antenna A and B have noise alternately superimposed thereon. A time T1 for which noise is superimposed on the reception signals may last for approximately 20 ms to 500 ms. The noise may be continuous, intermittent, etc. The diversity method is intended to selectively pick-up a reception signal wherein less noise is superimposed on the stereo signal than is superimposed on another reception signal. FIG. 1c shows a waveform of such a selected reception signal SRA or SRB. The selected better reception signal, as shown in FIG. 1c, is still affected by noise, since the noise is superimposed on both of the reception signals SRA and SRB at the same time. This overlapping of the noise may be based upon multipaths, but can not be essentially avoided, and as a result, when the selected reception signal is used to reproduce sound through a power amplifier and a speaker, the above noise causes the reproduced sound to appear unnatural or unclear to a listener in the automobile. FIG. 1d shows a concept of such unnatural sound.

To eliminate an adverse affect of the above multipath noise, a linear prediction method which predicts a linear change of a signal during a noise generation period. Referring to FIG. 2a, when the reception signal SR on which noise is superimposed is received, an untreated reception signal SR is not used during a time T11, as shown in FIG. 2b, corresponding to a noise superimposing time T10 shown in FIG. 2a, and a linear prediction of a signal is carried out during the time T11. This linear prediction is carried out by selecting at least two normal selected reception signals just before the generation of noise, and extrapolating a linear change in a current reception signal along the above two normal selected reception signals. This extrapolation can provide a good approximate value when a linear change is occurring in the stereo signal based on the reception signal, but the above noise in question can exist for a relatively long time, for example, 20 ms to 500 ms, and there is little linear change in the stereo signal during a relatively long time period. If the linear prediction is effected during the time T11 shown in FIG. 2b, a sound reproduction signal which is generated by the linear prediction provides an unnatural sound to the listener after the elapse of a predetermined time t1, as shown in FIG. 2c.

JPA 57-184331, published on Nov. 13, 1982, discloses a noise elimination apparatus which calculates the linear prediction coefficients of a continuous digital input signal, calculates a linear prediction value in response to the linear prediction coefficients, calculates a prediction error between the calculated linear prediction value and the continuous input data, calculates a threshold value in response to the continuous input data, and outputs a substitution signal when the prediction error exceeds the threshold value. This noise eliminates apparatus effectively suppresses burst errors or noise lasting for approximately 1 ms, but can not suppress noise over a relatively long time period of, for example, several milliseconds. In addition, the above noise elimination apparatus calculates a considerably complex algorithm, such as an autocorrection function, a numerical solution of linear equations, etc., and thus requires a high speed complex circuit.

JPA 61-191127, published on Aug. 25, 1986, discloses a noise elimination apparatus for a receiver. This noise elimination apparatus is used to eliminate burst multipath noise lasting for several milliseconds and contained in a decoded signal. The above noise elimination apparatus uses a Z-transformed transfer function, filtering technologies, etc., and a complex circuit construction, but can not eliminate noise which is a result of a combination of standing wave noise and multipath noise, as described previously.

An FM receiver set having an integral circuit (IC) for eliminating the affect of multipath noise is known (NIKKEI ELECTRONICS, May 19, 1986 (No. 395), pp. 131–134). In this receiver set, the IC rapidly changes a reproduction signal from a stereo signal state to a monotone signal state when multipath noise is detected, and slowly restores the reproduction signal from the monotone signal state to the stereo signal state. Accordingly, although IC prevents an extreme distortion of a sound, it does not essentially eliminate the effect of multipath noise.

Now, preferred embodiments of the present invention will be described.

First, referring to FIG. 3, a mobile radio-receiver system applying to an FM stereo sound reproduction system, which is mounted in an automobile, receives an FM stereo broadcast signal, and reproduces a stereo sound therefrom, will be described.

The mobile radio-receiver system is provided with a pair of diversity antennas 1A and 1B installed on the automobile and spaced at a distance of approximately $\lambda/4$, where $\lambda$ is a wavelength of a reception signal in question, an antenna switching circuit 2, a front-end intermediate frequency detection circuit 3, a multiplexer 4, a multipath noise detection circuit 5, an antenna switching control circuit 6, and a digital signal correction circuit 7. In addition, left side and right side power amplifiers 8L and 8R, and left side and right side speakers 9L and 9R are provided.

The front-end intermediate frequency detection circuit 3 includes a mixer and a detector (not shown). The mixer mixes a reception signal having a frequency of, for example, 82.5 MHz, and an intermediate frequency (IF) signal $I_f$ having a frequency of 10.7 MHz, to reduce the frequency of the reception signal at an IF. The detector detects the frequency converted reception signal and outputs same as an audio composite signal S3. The multiplexer 4 receives the audio composite signal S3 from the front-end intermediate frequency detection circuit 3, separates the signal S3 into a left side stereo signal S4L and a right side stereo signal S4R, and outputs those signals to the digital signal correction circuit 7.

Figure 4:
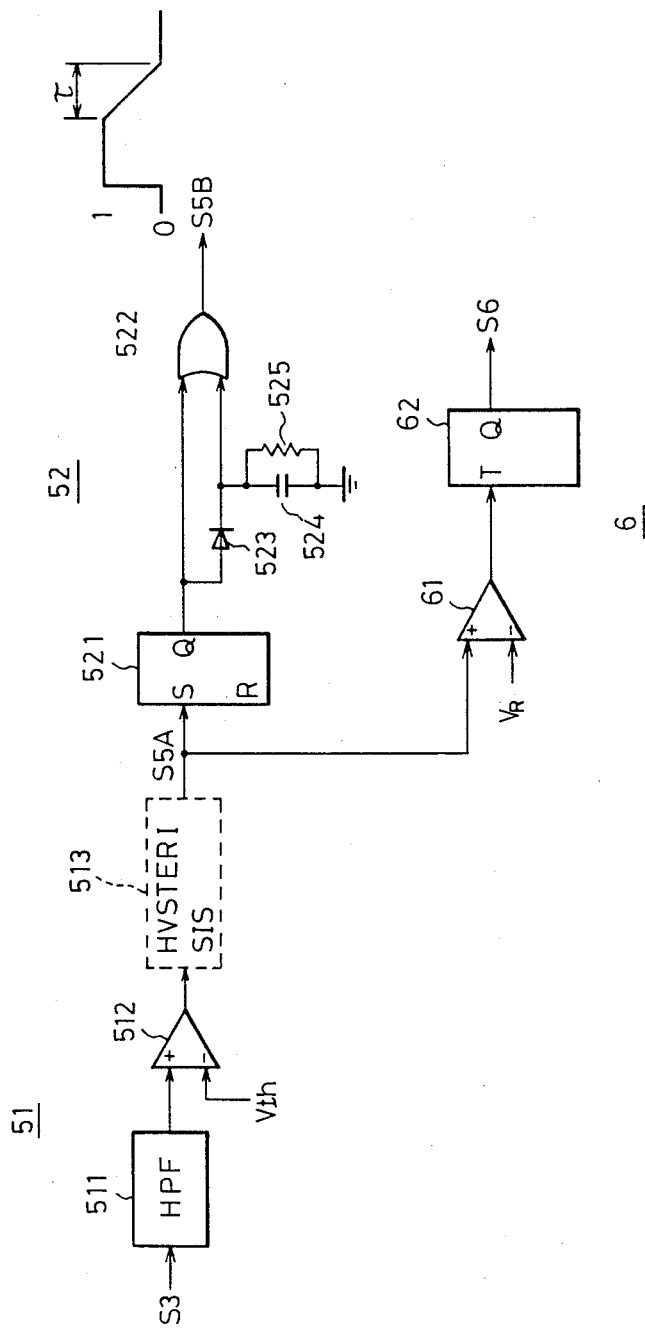
FIG. 4 is a circuit diagram of an embodiment of a multipath detection circuit and an antenna switching control circuit shown in FIG. 3.

The audio composite signal S3 is also applied to the multipath noise detection circuit 5. As shown in FIG. 4, the multipath noise detection circuit 5 includes a noise detection portion 51, and a multipath noise detection portion 52. The noise detection portion 51 receives the audio composite signal S3, detects noise, particularly multipath noise, superimposed on the audio composite signal S3 and outputs a first multipath noise detection signal S5A having a logical high level for as long as the noise is detected. The noise detection portion 51 includes a high pass filter for passing burst noise having frequencies higher than those of the audio composite signal, which may vary in a sinusoidal form at a frequency lower than that of the noise, and a comparator comparing the passed burst noise with a threshold value and outputting the first multipath noise detection signal S5A having a high level when the passed burst noise exceeds the threshold value. The noise detection portion 51 can be provided with a hysteresis circuit 513 for preventing hunting of the first multipath noise detection signal S5A. The multipath noise detection portion 52 responds to the first multipath noise detection signal S5A to output a second multipath noise detection signal S5B. The second multipath noise detection signal S5B is made high level in response to a change of the first multipath noise detection signal S5A to a high level and a low level having a time constant $\tau$ in response to the change of the first multipath noise detection signal S5A to a low level. The multipath noise detection portion 52 includes a set-reset (SR)-type flip-flop 521, an OR gate 522, a diode 523, and a time delay circuit consisting of a capacitor 524 and a resistor 525 connected in parallel. The time delay circuit defines the above time constant $\tau$.

As shown in FIG. 4, the antenna switching control circuit 6 is composed of a comparator 61 and a transfer (T)-type flip-flop 62. The comparator 61 compares the first multipath noise detection signal S5A with a reference voltage $V_R$, as a threshold value, and outputs a high level signal to the T-type flip-flop 62 when the first multipath noise detection signal S5A exceeds the reference voltage $V_R$. Upon receipt of a high level signal at a transfer input terminal T, the T-type flip-flop 62 outputs a switch change signal S6, which is different to a previous output, to the antenna switching circuit 2.

The antenna switching circuit 2 receives the reception signals S1A and S1B from the antenna 1A and 1B and selects one of those signals in response to the switch change signal S6. Specifically, the antenna switching circuit 2 outputs the first reception signal S1A when the switch change signal S6 is low level, and outputs the second reception signal S1B, when the switch change signal S6 is high level.

When noise is superimposed on both reception signals S1A and S1B at the same time, a current selected reception signal still can be output from the antenna switching circuit 2.

As described above, one of the reception signals S1A and S1B, having a low noise component, is selected at the antenna switching circuit 2, and converted into the intermediate frequency signal and detected at the front-end intermediate frequency detection circuit 3. The detected audio composite signal S3 is supplied to the multiplexer 4 and separated thereat into the left and right-side channel signals S4L and S4R.

The digital signal correction circuit 7 includes parallel-connected and independently operable left and right channel circuits. The left channel circuit consists of an analog-to-digital converter (ADC) 71L, a signal prediction circuit 72L, and a digital-to-analog converter DAC 73L connected in series. The right side channel circuit has a similar circuit construction as that of the left side channel circuit The left and right side channel circuits receive the separated left and right channel signals S4L and S4R from the multiplexers 4, respectively, but to simplify the explanation, only the operation of the left side channel circuit will be described hereunder.

Since the signal prediction described later in detail is carried out by a digital signal processing, the ADC 71L receives the left side channel signal S4L in an analog form and converts it into a digital signal S71L, and the DAC 73L converts a digital signal S72L predicted at the signal prediction circuit 72L into an analog signal S7L to be applied to the amplifier 8L. When a frequency of the left side channel signal S4L is 19 KHz, a sampling frequency of the ADC 71L is equal to or more than 38 KHz.

Figure 5:
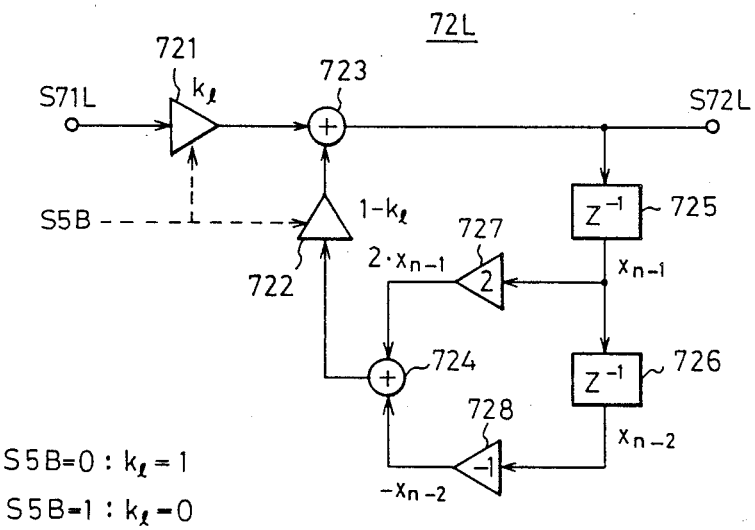
FIG. 5 is a circuit diagram of an embodiment of a linear signal prediction circuit shown in FIG. 3.
Figure 6:
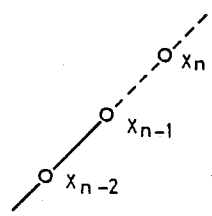
FIG. 6 is a graph representing a linear signal prediction of the linear signal prediction circuit shown in FIG. 5.

FIG. 5 shows an example of a circuit diagram of the signal prediction circuit 72L, which carries out a linear prediction. The signal prediction circuit 72L is composed of a first switching amplifier 721 having a gain $K_l$ and functioning as a switching element, a second switching amplifier 722 having a gain $(1-K_l)$ and functioning as a switching element, adders 723 and 724, memories 725 and 726, an operational amplifier 727 functioning as a multiplier having a multiplication constant of 2, and an operational amplifier 728 functioning as an inverter. The signal prediction circuit 72L calculates a current prediction data $X_n$ in a linear extrapolation by using a first previous normal data $X_{n-1}$ and a second previous normal data $X_{n-2}$, as shown by the following equations (1) and (2):

$$X_n = X_{n-1} + (X_{n-1} - X_{n-2}) \quad (1)$$

$$\therefore X_n = 2 \cdot X_{n-1} - X_{n-2} \quad (2)$$

In FIG. 5, the memory 725 holds the first previous normal data $X_{n-1}$, and the operational amplifier 727 outputs data $2 \cdot X_{n-1}$. The memory 726 holds the second previous normal data $X_{n-2}$, and the operational amplifier 728 outputs data $-X_{n-2}$. The adder 724 outputs data $(2 \cdot X_{n-1} - X_{n-2})$. The gain K of the switching amplifier 721 is set to zero, i.e., $K_l = 1$ when the second multipath noise detection signal S5B is low level, i.e., noise is not detected, to pass the signal S71L through the switching amplifier 721. In this case, the gain $(1-K_l)$ of the switching amplifier 722 is made zero, i.e., $(1-K_l)=0$, to prohibit the output of the data $(2 \cdot X_{n-1} - X_{n-2})$ added at the adder 722. The passed data is output as the prediction data S72L, supplied to the memory 725, and stored therein. In this case, the prediction data S72L is the untreated left side channel signal S71L. During this operation, the untreated left side channel signal S71L is consecutively stored and updated in the memories 725 and 726. Conversely, when the second multipath noise detection signal S5B is high level, the switching amplifier 721 is made inoperable, and the switching amplifier 722 is also made operable state. In this case, the linear prediction signal S72L is the data defined by the above formula (2), and the linear predicted data is consecutively stored and updated in the memories 725 and 726. The switching amplifiers 721 and 722 operate exclusively as set described above.

The linear signal prediction circuit 72L shown in FIG. 5 is operated synchronously with the sampling frequency 38 KHz of the ADC 71L. The DAC 73L receiving the linear prediction signal S72L and converting it into an analog signal is also operated at the sampling frequency 38 KHz.

FIGS. 7a and 7b show the above linear prediction. Since the noise does not exist before a time t11, the second multipath noise detection signal S5B is low level, and thus actual data $X_{a1}$ and $X_{a2}$ are output as the linear prediction signal S72L. When noise is detected at the time t11, the second multipath noise detection signal S5B is set to a high level, i.e., S5B=1, and linear predicted data $X_{p3}$ and $X_{p4}$ are output as the linear prediction signal S72L. Although the noise is eliminated at a time t12, the linear predicted data is output until at a time t13 after the time constant $\tau$ of the prediction switch signal generation circuit 52 from the time t12. This transient time $\tau$, during which the actual data is used as the linear prediction data, provides an advantage of a smooth signal change, but this is an option and thus can be omitted.

FIGS. 8a to 8e show an overall operation of the circuit shown in FIG. 3. The antenna reception signals S1A and S1B shown in FIGS. 8a and 8b are switched at the antenna switching circuit 2 and a switching signal is output as the audio composite signal S3 through the front-end intermediate frequency detection signal 3, as shown in FIG. 8c. By switching the reception signals S1A and S1B the standing wave noise is reduced and then, as shown in FIG. 8c, even if the multipath noise is superimposed on both reception signals S1A and S1B, the remaining noise on the audio composite signal S3 is greatly reduced in a short period, for example, approximately one tenth (1/10) or shorter. As a result, a time for predicting the signal becomes short, as shown in FIG. 8d. The linear signal prediction during a short period provides good prediction data, and thus the unnaturalness of sound passed through the power amplifier 8L and the speaker 9L can be eliminated, as shown in FIG. 8e.

The linear signal prediction circuit shown in FIG. 5 provides a simple linear prediction using only two adjacent normal data, and this linear signal prediction can be adopted for a variety of predictions. The formula (3) represents a linear signal prediction algorithm using four weighted data $X_{n-1}$, $X_{n-2}$, $X_{n-3}$, and $X_{n-4}$:

$$X_n = \tfrac{1}{2}(4 \cdot X_{n-1} - 3 \cdot X_{n-2} + 2 X_{n-3} - X_{n-4}) \tag{3}$$

Figure 9:
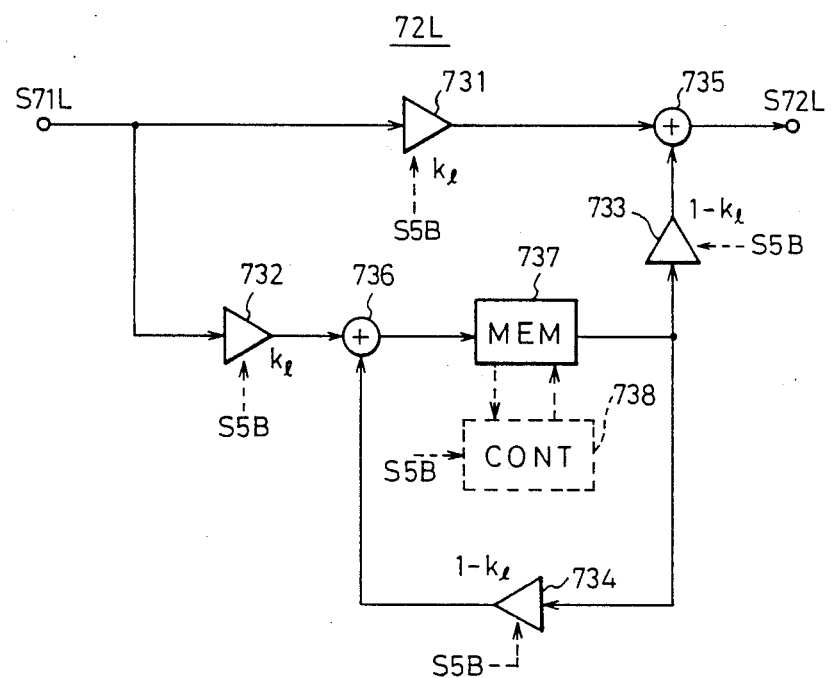

FIG. 9 shows a circuit diagram of another signal prediction circuit 72L. The signal prediction circuit 72L is composed of first and second switching amplifiers 731 and 732 having gains $K_l$, respectively, third and fourth switching amplifiers 733 and 734 having gains $(1-K_l)$, respectively, adders 735 and 736, a memory 737, and a memory control circuit 738. The first and second switching amplifiers 731 and 732, and the third and fourth switching amplifiers 733 and 734, are exclusively operated in response to a state of the second multipath noise detection signal S5B.

When the second multipath noise detection signal S5B is low level, the gain $K_l$ is one, i.e., $K_l = 1$, and thus $(1-K_l)=0$, an actual data S71L is output as the prediction data S72L and stored in the memory 737 through the switching amplifier 732 and the adder 736. At this time, an output data of the switching amplifier 734 is zero. The storage of the data into the memory 737 is made cyclic and to updata the latest data by overwriting old data. The capacity of the memory 737 should be a half of the data for one cycle of each channel data.

When the second multipath noise detection signal S5B becomes high level, the switching amplifiers 731 and 732 are inhibited and the switching amplifiers 733 and 734 are made open to pass the data therethrough. As a result, the data stored in the memory 737 is output as the prediction data S72L through the switching amplifier 733 and the adder 735. At this time, an output of the switching amplifier 731 is zero. The data output from the memory 737 is again stored into the memory 737 through the switching amplifier 734 and adder 736.

The above prediction uses recent normal data stored in the memory 737, but a data output sequence is not synchronized with a time at which the second multipath noise detection signal is generated. Preferably, a data output sequence can be synchronized with a time of the generation of the second multipath noise detection signal S5B, to output the latest data from the memory 737. This can be easily achieved by discriminating the last address storing the data in the memory corresponding to the time of the generation of the second multipath noise detection signal S5B, and deciding a start address to which the data is to be output. This can be carried out at the memory control circuit 738.

The signal prediction circuit shown in FIG. 9 outputs previous normal data stored in the memory 737 as the prediction data. Since the prediction time is very short, non-artificial data can be used for the reproduction data.

In the above embodiments, the reproduction of a stereo signal was discussed, but the present invention can be also applied to the reproduction of a monotone signal.

Many widely different embodiments of the present invention may be constructed without departing from the spirit and scope of the present invention. It should be understood that the present invention is not limited to the specific embodiments described in this specification, except as defined in the appended claims.

We claim:

1. A mobile radio-receiver system comprising:
   a pair of antennas installed on a mobile body and spaced at a predetermined distance;
   a switching circuit operatively connected to said pair of antennas to receive two different radio-reception signals therefrom which are based upon a same transmission signal and selecting one of said radio-reception signals in response to a switching signal;
   detection means, operatively connected to said switching circuit, for detecting said selected signal from therefrom,
   noise detection means, operatively connected to said detection means, for detecting noise superimposed on said signal detected at said detection means, and outputting a noise detection signal;
   antenna switching control means, operatively connected between said noise detection means and said switching circuit, for outputting said switching signal to said switching circuit in response to said noise detection signal; and
   digital signal correction means, operatively connected to said detection means, and including an analog-to-digital converting means, for converting the data from said detection means in an analog form into a digital value, digital-type signal prediction means, for digitally predicting data converted at said analog-to-digital converting means, and digital-to-analog converting means for converting data from said digital-type signal prediction means into data in an analog form, said digital-type signal prediction means being operated in synchronization with a sampling time of said analog-to-digital converting means, and said digital-to-analog converting means being operated in synchronization with the operation of said signal prediction means, for digitally correcting data from said detection means when said noise detection signal indicates the existence of noise, or for outputting said data from said detection means when said noise detection signal does not indicate the existence of noise.

2. A mobile radio-receiver system according to claim 1, wherein said detection means converts said selected signal at an intermediate frequency, prior to said detecting.

3. A mobile radio-receiver system according to claim 2, said noise detection means comprises
   first noise detection means for providing a first noise detection signal, having a high pass filtering means for receiving said detected signal and for passing a high frequency signal corresponding to the noise, and first comparing means for comparing said high frequency signal with a first threshold level to provide the first noise detection signal, and
   second noise detection means for providing a second noise detection signal, having a signal holding means for receiving and holding said first noise detection signal, a time delay means having a predetermined time constant for delaying said held signal by said predetermined time constant, and an adding means for adding said held signal and said delayed signal to provide the second noise detection signal which is rapidly changed in response to a change of said first noise detection signal to a high level and slowly changed in response to a change of said first noise detection signal to a low level
   said noise detection signal comprising said first and second noise detection signals, and said antenna switching control means outputting said switching signal in response to said second noise detection signal.

4. A mobile radio-receiver system according to claim 3, wherein said first noise detection means in said noise detection means further comprises a hysteresis judging means for judging said first noise detection signal output from said first comparing means by a hysteresis characteristic thereof, and outputting the same.

5. A mobile radio-receiver system according to claim 3 wherein said antenna switching control means comprises a second comparing means for comparing said first noise detection signal with a second threshold level and a signal alternating means for alternating a signal level of an output of said second comparing means to provide said switching signal.

6. A mobile radio-receiver system according to claim 1, wherein said signal correction means comprises a linear signal prediction means for a linear predicting said detected signal.

7. A mobile radio-receiver system according to claim 6, wherein said linear signal prediction means calculates a linear prediction data $X_n$, defined by the following formula:

$$X_n = 2X_{n-1} - X_{n-2} \quad (1)$$

where, $X_{n-1}$ is a first previous normal data, and $X_{n-2}$ is a second previous normal data.

8. A mobile radio-receiver system according to claim 6, wherein said linear signal prediction means calculates a linear prediction data $X_n$, defined by the following formula:

$$X_n = \tfrac{1}{2}(4 \cdot X_{n-1} - 3 \cdot X_{n-2} + 2X_{n-3} - X_{n-4})$$

where, $X_{n-1}$ to $X_{n-4}$ are first to fourth previous normal data.

9. A mobile radio-receiver system according to claim 1, wherein said signal correction means comprises a memory for storing normal data, and outputting the stored normal data as said correction data in response to a predetermined sequence when said noise detection signal indicates the existence of noise.

10. A mobile radio-receiver system according to claim 9, wherein said output of the stored normal data is effected synchronously with the detection of noise.

11. A mobile radio-receiver system according to claim 1, further comprising signal multiplexing means provided between said detection means and said signal correction means, for multiplexing said detected signal into right and left channel signals for a reproduction of stereo sound, and said signal correction means comprising right and left channel signal correction means for receiving said right and left channel signals, respectively, and independently correcting the received signals.

12. A mobile radio-receiver system according to claim 1, further comprising sound reproduction means, operatively connected to said signal correction means, for reproducing sound.

13. A mobile radio-receiver system according to claim 12, wherein said sound reproduction means comprises an FM radio-set, and said mobile body is a vehicle, such as an automobile.

14. A mobile radio-receiver system comprising:
a pair of antennas installed on a mobile body and spaced at a predetermined distance;
a switching circuit operatively connected to said pair of antenna to receive two different radio-reception signals therefrom which are based upon a same transmission signal and selecting one of said radio-reception signals in response to a switching signal;
detection means, operatively connected to said switching circuit, for detecting said selected signal from therefrom;
noise detection means, operatively connected to said detection means, for detecting noise superimposed on said signal detected at said detection means, and outputting a noise detection signal;
antenna switching control means, operatively connected between said noise detection means and said switching circuit, for outputting said switching signal to said switching circuit in response to said noise detection signal; and
digital signal correction means, operatively connected to said detection means, for correcting data from said detection means in an analog form when said noise detection signal indicates the existence of noise, or for outputting said data from said detection means when said noise detection signal does not indicate the existence of noise.

* * * * *